United States Patent
Wang et al.

(10) Patent No.: US 6,590,039 B1
(45) Date of Patent: Jul. 8, 2003

(54) SILANE GRAFTED COPOLYMERS OF AN ALPHA-OLEFIN AND A VINYL AROMATIC MONOMER

(75) Inventors: Hsien-Chang Wang, Bellaire, TX (US); David Yen-Lung Chung, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/913,948

(22) PCT Filed: Jan. 27, 2000

(86) PCT No.: PCT/US00/02019

§ 371 (c)(1), (2), (4) Date: Jun. 24, 2002

(87) PCT Pub. No.: WO00/52071

PCT Pub. Date: Sep. 8, 2000

Related U.S. Application Data

(60) Provisional application No. 60/122,502, filed on Mar. 2, 1999.

(51) Int. Cl.[7] .............................................. C08F 275/00
(52) U.S. Cl. ....................................................... 525/288
(58) Field of Search .......................................... 525/288

(56) References Cited

U.S. PATENT DOCUMENTS

| | | | |
|---|---|---|---|
| 3,075,948 A | 1/1963 | Santelli | 260/45.5 |
| 5,543,484 A | 8/1996 | Chung et al. | 526/347.1 |
| 5,866,659 A | 2/1999 | Chung et al. | 525/279 |
| 5,869,591 A | 2/1999 | McKay et al. | 526/347 |
| 6,011,120 A | 1/2000 | Frechet et al. | 525/288 |

FOREIGN PATENT DOCUMENTS

| | | |
|---|---|---|
| DE | 19 06 088 A | 2/1969 |
| EP | 0 243 124 | 10/1987 |
| EP | 0 426 073 | 5/1991 |
| FR | 2 030 899 | 11/1970 |
| FR | 2 293 776 | 7/1976 |
| WO | WO 91/04992 | 4/1991 |
| WO | WO 92/16569 | 10/1992 |
| WO | WO 94/13718 | 7/1994 |
| WO | WO 95/29197 | 11/1995 |
| WO | WO 96/11959 | 4/1996 |
| WO | WO 96/16096 | 5/1996 |
| WO | WO 96/36650 | 11/1996 |
| WO | WO 97/05176 | 2/1997 |
| WO | WO 98/28347 | 7/1998 |

*Primary Examiner*—Bernard Lipman
(74) *Attorney, Agent, or Firm*—Kevin M. Faulkner; Leandro Arechederra

(57) ABSTRACT

Curable silylated copolymers based on olefin copolymers comprising at least one alpha-olefin and a vinyl aromatic monomer (alkyl styrene) are prepared by reacting the olefin copolymer with an olefinically unsaturated hydrolyzable silane in the presence of a free radical generating agent. The silylated copolymers are readily curable by contact with water (moisture) and a silanol condensation catalyst and are particularly useful as the polymeric component in sealant, caulking, adhesive and coating formulations.

23 Claims, No Drawings ial application No. 60/122,502, filed Mar. 2, 1999, the disclosure of which is incorporated by reference.

BACKGROUND OF THE INVENTION

Field of the Invention

The invention relates to curable silane-grafted alpha-olefin/vinyl aromatic copolymers particularly useful in sealants, caulks, adhesives and coating compositions. Relevant disclosures are found in WO 95/29197 and U.S. Pat. No. 5,869,591.

SUMMARY OF THE INVENTION

The present invention provides a silylated copolymer which is the reaction product of a) an olefin copolymer comprising at least 50 mole % of at least one alpha-olefin and at least one alkylstyrene monomer; b) a silane of the general formula RR'SiY$_2$ wherein R represents a monovalent olefinically unsaturated hydrocarbon or hydrocarbonoxy radical, each Y represents a hydrolyzable organic radical and R' represents an alkyl or aryl radical or a Y radical; and c) a free radical generating agent.

The invention also provides a process for producing a silylated copolymer which comprises the steps of contacting: a) an olefin copolymer comprising at least 50 mole % of at least one alpha-olefin and at least one alkylstyrene monomer; and b) a silane of the general formula RR'SiY$_2$ wherein R represents a monovalent olefinically unsaturated hydrocarbon or hydrocarbonoxy radical, each Y represents a hydrolyzable organic radical and R' represents an alkyl or aryl radical or a Y radical; said contact being made in the presence of a free radical generating agent at reaction conditions in a reaction zone.

The silylated copolymers of the invention are readily curable by contact with water (moisture) and a silanol condensation catalyst and are useful as a polymeric component in sealant, caulking, adhesive and coating formulations.

DETAILED DESCRIPTION OF THE INVENTION

The silylated copolymers of the invention may be characterized as the addition product of an olefin copolymer radical created by contact of the copolymer with a free radical generating agent and an olefinically unsaturated, hydrolyzable silane wherein the silane adds to the polymer backbone to produce a silane grafted or silane modified copolymer product.

Olefin copolymers suitable for modification in accordance with this invention comprise copolymers containing at least 50 mole % of at least one alphaolefin and from about 0.1 up to 50 mole % of at least one vinyl aromatic monomer. Preferred alpha-olefins have from 2 to 12 carbon atoms. More preferably, the alpha-olefins are selected from the group consisting of ethylene, propylene and 1-butene. Preferred vinyl aromatic monomers are mono-vinyl aromatics such as styrene, alpha-methylstyrene, alkyl-substituted styrenes such as t-butylstyrene and para-alkyl substituted styrenes wherein the alkyl group contains from 1 to 4 carbon atoms, more preferably para-methylstyrene.

Preferred olefin copolymers include copolymers comprising ethylene and para-methylstyrene and containing from about 0.1 to 20 mole % of paramethylstyrene. These copolymers have a substantially homogeneous compositional distribution. They are also characterized by a narrow molecular weight distribution (Mw/Mn) of less than about 8, more preferably less than about 4, most preferably less than about 2.5, and a number average molecular weight (Mn) in the range of about 1,000 to 1,000,000, and even more preferably from 10,000 to 50,000.

These copolymers may be prepared by the polymerization process disclosed in U.S. Pat. No. 5,543,484, the complete disclosure of which is incorporated herein by reference. These copolymers are prepared by solution polymerization of the monomer mixture in the presence of a metallocene catalyst such as zirconocene or titanocene coordination compounds with single or double cyclopentadienyl derivatives in conjunction with an activating cocatalyst such as a Bronsted acid salt.

Another class of olefin copolymers which are useful in the present invention contain at least 50 mole % of an ethylene-propylene copolymer and from about 0.1 up to 50 mole % of at least one vinyl aromatic monomer. Preferred vinyl aromatic monomers are mono-vinyl aromatics such as styrene, alpha-methylstyrene, alkyl-substituted styrenes such as t-butylstyrene and para-alkyl substituted styrenes wherein the alkyl group contains from 1 to 4 carbon atoms, more preferably para-methylstyrene. The EP-PMS terpolymers can be prepared using the process disclosed in U.S. Pat. No. 5,543,484. Preferably, the ethylene-propylene copolymers of the present invention are from about 4 to 80 weight percent propylene. More preferably, they are from about 50 to 70 weight percent propylene. A preferred PMS content for these terpolymers is from 5 to 25 weight percent. Other preferred physical parameters, such as molecular weight, are the same as those described for the alpha-olefin/PMS copolymers of the present invention.

The terms "alkylstyrene" or "methylstyrene" are not intended to exclude functionalized styrenes which contain benzylic functionality such as halogen, carboxyl, hydroxy and like functionality as disclosed in the aforementioned U.S. Pat. Nos. 5,162,445 and 5,543,484, although the presence of such functionality is not necessary and superfluous for the purposes of the present invention.

Suitable unsaturated organic silanes which are reacted with the olefin copolymer backbone are of the general formula RR'SiY$_2$ wherein R represents a monovalent olefinically unsaturated hydrocarbon or hydrocarbonoxy radical reactive with the free radical sites produced on the backbone polymer, Y represents a hydrolyzable organic radical and R' represents an alkyl or aryl radical or a Y radical. Where R is a hydrocarbonoxy radical, it should be non-hydrolyzable. In the preferred embodiment R may be a vinyl, allyl, butenyl, 4-pentenyl, 5-hexenyl, cyclohexenyl or cyclopentadienyl radical, with vinyl being the most preferred radical. The group Y may be one or a mixture of $C_1$ to $C_4$ alkoxy radical such as methoxy, ethoxy or butoxy; Y may also be selected from acyloxy radicals such as formyloxy, acetoxy or propionoxy; oximo radicals such as —ON=C(CH$_3$)$_2$—ON=C(CH$_3$)(C$_2$H$_5$) and —ON=C(C$_6$H$_5$)$_2$; or substituted amino radicals such as alkylamino or arylamino radicals, including —NHCH$_3$, —NHC$_2$H$_5$ and —NHC$_6$H$_5$ radicals. The group R' represents either an alkyl group, an aryl group or a Y group. The group R' can be exemplified by a methyl, ethyl, propyl, butyl, phenyl, alkylphenyl group or a Y group. Preferably, R' is a methyl or alkoxy group. The most preferred silanes are those where R' and Y are selected from methyl and alkoxy groups, e.g., vinyltriethoxysilane, vinyltrimethoxysilane and methyl vinyl dimethoxysilane.

Modification of the olefin copolymer backbone is carried out by contact of the copolymer and the unsaturated organic silane in a suitable reaction zone and under reaction conditions in the presence of a free radical generator which may be a chemical compound or radiation.

Suitable free radical initiators include thermally decomposable compounds which generate radicals such as organic peroxides; compounds which generate free radicals by nonthermal methods such as photochemical or redox processes; compounds which have inherent radical character such as molecular oxygen; or electromagnetic radiation such as X-rays, electron beams, visible light or ultraviolet-light.

Suitable organic peroxide compounds include hydroperoxides, dialkyl peroxides, diacyl peroxides, peroxyesters, peroxydicarbonates, peroxyketals, ketone peroxides and organosulfonyl peroxides.

Preferably, the free radical initiator is an organic peroxide compound having a half-life, at the reaction temperature, of less than one tenth of the reaction/residence time employed.

When the free radical initiator is a compound, suitable molar ratio of free radical initiator compound to silane may range from 0.001:1 to 1:1, preferably from about 0.01:1 to about 0.1:1.

Desirably, the molar amount of silane, expressed in mmoles per gram, in the contacting zone may be 1 to 10 times the molar amount of these components as is desired in the final grafted copolymer. Thus, when the molar amount of silane in the grafted copolymer is 0.05 mmoles per gram of product polymer, the amount of silane introduced in the reaction zone is suitably from about 0.05 to about 0.5 mmoles per gram of the total of the copolymer and silane present in the reaction mixture.

The grafting reaction may be conducted in the absence of a diluent or in the presence of a diluent. Where a diluent is present in the reaction zone, suitable diluents include saturated aliphatic hydrocarbons, aromatic hydrocarbons, and perhalogenated hydrocarbons.

The grafting reaction to produce the grafted polymer of the present invention may also be conducted in the absence of a diluent and in the bulk phase, wherein the copolymer is in the molten state. The reaction temperature is chosen to be appropriate for the initiator used.

Suitable reaction condition's include a temperature ranging from about 0° C. to about 300° C. The reaction temperature will vary according to the free radical initiator used. When an organic peroxide is used as an initiator, suitable temperatures range from about 25° to about 250° C. Higher temperatures may be used for other types of free radical initiators. When the reaction is conducted in the presence of a diluent, i.e., solution processes, the reaction temperature will generally be below 150° C. For melt phase processes (i.e., bulk phase processes), the reaction temperature may range from about 25° C., such as in conventional electron beam irradiation equipment to about 250° C., such as in polymer mixing equipment. The process for producing the grafted polymers of the present invention may be conducted as a batch process or as a continuous process.

The reaction is performed in a suitable reaction zone which may be a polymer mixing device such as a Banbury mixer, a single or multiple screw extruder and the like for molten polymers or a glass flask, metal tank or tube when the process is conducted in the presence of a diluent.

Additionally, it may be desirable to reduce the molecular weight of the silylated copolymer of the present invention. This can be accomplished in several ways, including high shear mixing and extruding. Preferably, an extruder is used. More preferably, a twin screw extruder is used.

Extruder breakdown of the polymer can take place at several different steps in the process. The molecular weight breakdown of the olefin copolymer/backbone can be carried out prior to grafting. Also, the molecular weight breakdown of the silylated copolymer can be carried out after the grafting reaction. Finally, the molecular weight breakdown can occur during the grafting reaction. Preferably, the temperature of the reaction zones in the extruder ranges from about 150° C. to about 300° C. An extruder breakdown process which is useful in the present invention is disclosed in U.S. Pat. No. 5,651,927, which is herein incorporated by reference.

After extruder breakdown, the molecular weight of the olefin copolymer/backbone and/or the silylated copolymer preferably ranges from about 5,000 to about 100,000 $M_n$. More preferably, the molecular weight ranges from about 10,000 to about 50,000 $M_n$.

When the molten copolymer itself is the reaction medium, uniform dispersion of the grafting agent and of the initiator is preferably performed by predispersion or by the incorporation of suitable mixing elements into the reactor (e.g., incorporation of mixing screw sections in an extruder). When electromagnetic radiation is used, dispersion of the free radical generator will include uniform exposure of all parts of the olefin copolymer or copolymer solutions to the beam.

Preferably the grafting reaction is conducted such that the resulting silylated copolymers contain an average of from about 0.5 to about 15, more preferably from about 1 to about 5 moles of hydrolyzable silyl groups per molecular chain, as measured by $^1$HNMR.

As indicated above, it is most surprising that the olefin copolymers can be grafted by the free radical mechanisms disclosed without substantial degradation of the polymer backbone. It is believed that the process leads to selective silylation primarily at the benzylic hydrogen sites around the copolymerized vinyl aromatic monomers which are dispersed randomly along the polymer chain.

The silylated copolymers of the present invention may be cured by contact with or mixing with water (moisture), preferably in the presence of a silanol condensation catalyst. Suitable catalysts include metal carboxylates such as dibutyltin dilaurate, stannous octoate, stannous acetate, lead naphthenate and zinc octoate; organic metal compounds such as titanium esters and chelates such as tetrabutyl titanate; organic bases such as ethylamine, hexylamine and piperidine; and acids such as mineral acids and fatty acids. Preferred catalysts are organic tin compounds such as dibutyltin dilaurate and stannous octoate. The amount of catalyst employed will generally range from about 0.1 to 10 parts by weight per 100 parts by weight of silylated copolymer.

The silylated copolymers of the invention are ideally suited for use in sealant, adhesive, caulking and coating compositions. Such compositions may also contain other conventional additives such as fillers, plasticizers, extender oils, colorants, antioxidants, other polymers and like additives as are known in the art. The compositions may be packaged in single anhydrous packages or in two-package systems, one containing an anhydrous composition based on the silylated copolymer and a second package containing a composition containing the catalyst and water which packages are adapted to be mixed prior to application and the resulting composition cured in-situ after application.

What is claimed is:

1. A silylated copolymer which is the reaction product of:
   a) an olefin copolymer comprising at least 50 mole % of at least one alpha-olefin and at least one alkylstyrene monomer;
   b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an aryl radical or a Y radical; and
   c) a free radical generating agent; wherein the silane reacts with the alkylstyrene monomer unit of the copolymer;
   wherein the silylated copolymer comprises from about 0.1 up to 20 mole % of the at least one alkylstyrene monomer.

2. The silylated copolymer of claim 1 wherein said olefin copolymer comprises at least 60 mole % ethylene.

3. The silylated copolymer of claim 1 wherein said alkylstyrene comprises para-methylstyrene.

4. The silylated copolymer of claim 1 wherein said silane is a vinyl trialkoxy silane or methylvinyldialkoxy silane wherein the alkoxy group contains 1 to 4 carbon atoms.

5. The silylated copolymer of claim 1 wherein said free radical generating agent is an organic peroxide.

6. The silylated copolymer of claim 1 wherein said olefin copolymer has a number average molecular weight in the range of about 1,000 to 1,000,000.

7. The silylated copolymer of claim 1 wherein the number average molecular weight of said olefin copolymer is in the range of about 5,000 to 100,000.

8. The silylated copolymer of claim 1 wherein the number average molecular weight of said olefin copolymer is in the range of about 10,000 to 50,000.

9. The silylated copolymer of claim 1 wherein said olefin copolymer contains an average of from about 0.5 to about 15 moles of silyl groups per molecular chain, as measured by $^1H$ NMR.

10. The silylated copolymer of claim 9 containing an average of from about 1 to about 5 moles of silyl groups per molecular chain.

11. A process for producing a silylated copolymer which comprises the steps of contacting:
    a) an olefin copolymer comprising at least 50 mole % of at least one alpha-olefin and at least one alkylstyrene monomer; and
    b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an aryl radical or a Y radical; said contact being made in the presence of a free radical generating agent at reaction conditions in a reaction zone and wherein the silane reacts with the alkylstyrene monomer unit of the copolymer;
    wherein the silylated copolymer comprises from about 0.1 up to 20 mole% of the at least one alkylstyrene monomer.

12. The process of claim 11 wherein said alkylstyrene monomer is an para-alkylstyrene.

13. The process of claim 11 wherein said free radical generating agent is an organic peroxide, present at a molar ratio to said about 0.01:1 to silane of from about 0.1:1.

14. The process of claim 11 wherein said silane is present in the reaction mixture at a level of from about 0.05 to about 0.5 mmoles per gram of olefin copolymer plus silane.

15. The process of claim 11 wherein said contact step is conducted in the absence of a diluent and wherein said olefin copolymer is in the molten state.

16. The process of claim 11 wherein said contact step is conducted in the presence of a diluent.

17. The process of claim 11 wherein said silane is present in said reaction zone at a level such that said silylated copolymer contains an average of from about 0.5 to about 15 moles of silyl groups per molecular chain, as measured by $^1H$ NMR.

18. A cured silylated copolymer of claim 1 prepared by contacting said silylated copolymer with water in the presence of a silanol condensation catalyst.

19. The process of claim 11 wherein the molecular weight of said olefin copolymer is reduced prior to contact with said silane.

20. The process of claim 19 wherein the molecular weight of said olefin copolymer is reduced using an extruder.

21. The process of claim 11 further comprising reducing the molecular weight of said silylated copolymer after contacting said olefin copolymer with said silane.

22. The process of claim 21 wherein the molecular weight of said silylated copolymer is reduced using an extruder.

23. The process of claim 11 wherein said olefin copolymer is contacted with said silane in an extruder.

* * * * *